(12) United States Patent
Radi et al.

(10) Patent No.: US 12,088,470 B2
(45) Date of Patent: Sep. 10, 2024

(54) MANAGEMENT OF NON-VOLATILE MEMORY EXPRESS NODES

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/175,449

(22) Filed: Feb. 12, 2021

(65) Prior Publication Data

US 2022/0200867 A1 Jun. 23, 2022

Related U.S. Application Data

(60) Provisional application No. 63/127,423, filed on Dec. 18, 2020.

(51) Int. Cl.
*H04L 41/12* (2022.01)
*H04L 41/14* (2022.01)
*H04L 67/1097* (2022.01)

(52) U.S. Cl.
CPC ............. *H04L 41/12* (2013.01); *H04L 41/14* (2013.01); *H04L 67/1097* (2013.01)

(58) Field of Classification Search
CPC ...... G06F 3/061; G06F 3/0614; G06F 3/0653; G06F 11/0784; G06F 3/0617;
(Continued)

(56) References Cited

U.S. PATENT DOCUMENTS

| 6,044,438 A | 3/2000 | Olnowich |
| 6,078,997 A | 6/2000 | Young et al. |

(Continued)

FOREIGN PATENT DOCUMENTS

KR 102163279 B1 10/2020

OTHER PUBLICATIONS

Hashemi et al.; "Learning Memory Access Patters"; 15 pages; Mar. 6, 2018; available at https://arxiv.org/pdf/1803.02329.pdf.

(Continued)

*Primary Examiner* — Tonia L Dollinger
*Assistant Examiner* — Linh T. Nguyen
(74) *Attorney, Agent, or Firm* — Barry IP Law, P.C.

(57) ABSTRACT

A programmable switch includes ports configured to communicate with Non-Volatile Memory express (NVMe) nodes. The programmable switch is configured to store a mapping of NVMe namespaces to physical storage locations located in the NVMe nodes. An NVMe node is determined by the programmable switch to have become inactive, and one or more NVMe namespaces are removed from the mapping that are associated with one or more physical storage locations in the inactive NVMe node. A notification of the one or more removed NVMe namespaces is sent to a network controller. According to one aspect, the network controller stores a global mapping of NVMe namespaces to physical storage locations in the NVMe nodes. The network controller sends at least one notification of the update to at least one other programmable switch to update at least one mapping stored at the at least one other programmable switch.

20 Claims, 7 Drawing Sheets

(58) Field of Classification Search
CPC ...... G06F 3/0683; G06F 9/5016; G06F 3/067;
G06F 3/0622; G06F 3/0635; G06F 16/60;
G06F 16/70; H04L 41/0866; H04L 41/12;
H04L 41/14; H04L 67/1097; H04L 65/60;
H04L 45/02; H04L 45/54; H04L 45/66;
H04W 88/02; A63F 13/12; H04S
2400/13; H04S 7/301; H04S 7/302; H04R
1/406; H04R 3/005; H04R 5/02; H04R
29/006; H04R 3/12; H04H 20/18
See application file for complete search history.

(56) References Cited

U.S. PATENT DOCUMENTS

| | | |
|---|---|---|
| 6,108,737 A | 8/2000 | Sharma et al. |
| 6,209,065 B1 | 3/2001 | Van Doren et al. |
| 6,230,243 B1 | 5/2001 | Elko et al. |
| 6,263,404 B1 | 7/2001 | Borkenhagen et al. |
| 6,298,418 B1 | 10/2001 | Fujiwara et al. |
| 6,343,346 B1 | 1/2002 | Olnowich |
| 6,775,804 B1 | 8/2004 | Dawson |
| 6,829,683 B1 | 12/2004 | Kuskin |
| 6,868,439 B2 | 3/2005 | Basu et al. |
| 6,954,844 B2 | 10/2005 | Lentz et al. |
| 6,993,630 B1 | 1/2006 | Williams et al. |
| 7,032,078 B2 | 4/2006 | Cypher et al. |
| 7,376,799 B2 | 5/2008 | Veazey et al. |
| 7,673,090 B2 | 3/2010 | Kaushik et al. |
| 7,716,425 B1 | 5/2010 | Uysal et al. |
| 7,975,025 B1 | 7/2011 | Szabo et al. |
| 8,166,251 B2 | 4/2012 | Luttrell |
| 8,281,075 B2 | 10/2012 | Arimilli et al. |
| 9,088,592 B1 | 7/2015 | Craft et al. |
| 9,442,850 B1 | 9/2016 | Rangarajan et al. |
| 9,467,380 B2 | 10/2016 | Hong et al. |
| 9,712,381 B1 | 7/2017 | Emanuel et al. |
| 9,819,739 B2 | 11/2017 | Hussain et al. |
| 9,825,862 B2 | 11/2017 | Bosshart |
| 9,826,071 B2 | 11/2017 | Bosshart |
| 9,880,768 B2 | 1/2018 | Bosshart |
| 9,910,615 B2 | 3/2018 | Bosshart |
| 9,912,610 B2 | 3/2018 | Bosshart et al. |
| 9,923,816 B2 | 3/2018 | Kim et al. |
| 9,936,024 B2 | 4/2018 | Malwankar et al. |
| 9,940,056 B2 | 4/2018 | Bosshart |
| 10,038,624 B1 | 7/2018 | Cruz et al. |
| 10,044,583 B2 | 8/2018 | Kim et al. |
| 10,050,854 B1 | 8/2018 | Licking et al. |
| 10,063,407 B1 | 8/2018 | Kodeboyina et al. |
| 10,063,479 B2 | 8/2018 | Kim et al. |
| 10,063,638 B2 | 8/2018 | Huang |
| 10,067,967 B1 | 9/2018 | Bosshart |
| 10,075,567 B1 | 9/2018 | Licking et al. |
| 10,078,463 B1 | 9/2018 | Bosshart |
| 10,084,687 B1 | 9/2018 | Sharif et al. |
| 10,110,454 B2 | 10/2018 | Kim et al. |
| 10,127,983 B1 | 11/2018 | Peterson et al. |
| 10,133,499 B2 | 11/2018 | Bosshart |
| 10,146,527 B2 | 12/2018 | Olarig et al. |
| 10,158,573 B1 | 12/2018 | Lee et al. |
| 10,164,829 B1 | 12/2018 | Watson et al. |
| 10,169,108 B2 | 1/2019 | Gou et al. |
| 10,225,381 B1 | 3/2019 | Bosshart |
| 10,230,810 B1 | 3/2019 | Bhide et al. |
| 10,237,206 B1 | 3/2019 | Agrawal et al. |
| 10,257,122 B1 | 4/2019 | Li et al. |
| 10,268,634 B1 | 4/2019 | Bosshart et al. |
| 10,298,456 B1 | 5/2019 | Chang |
| 10,496,566 B2 | 12/2019 | Olarig et al. |
| 10,503,679 B2* | 12/2019 | Huang ............... H04L 67/1097 |
| 10,628,353 B2 | 4/2020 | Prabhakar et al. |
| 10,635,316 B2 | 4/2020 | Singh et al. |
| 10,742,557 B1 | 8/2020 | Miriyala |
| 10,761,995 B2 | 9/2020 | Blaner et al. |
| 10,812,388 B2 | 10/2020 | Thubert et al. |
| 10,880,204 B1 | 12/2020 | Shalev et al. |
| 2003/0009637 A1 | 1/2003 | Arimilli et al. |
| 2003/0028819 A1 | 2/2003 | Chiu et al. |
| 2003/0158999 A1 | 8/2003 | Hauck et al. |
| 2004/0044850 A1 | 3/2004 | George et al. |
| 2004/0073699 A1 | 4/2004 | Hong et al. |
| 2004/0260883 A1 | 12/2004 | Wallin et al. |
| 2005/0058149 A1 | 3/2005 | Howe |
| 2006/0265568 A1 | 11/2006 | Burton |
| 2006/0271598 A1* | 11/2006 | Wong .................... G06F 16/119 |
| 2007/0067382 A1 | 3/2007 | Sun |
| 2008/0010409 A1 | 1/2008 | Rao et al. |
| 2009/0213850 A1 | 8/2009 | Viger et al. |
| 2009/0240664 A1 | 9/2009 | Dinker et al. |
| 2009/0240869 A1 | 9/2009 | O'Krafka et al. |
| 2009/0313503 A1 | 12/2009 | Atluri et al. |
| 2010/0008260 A1* | 1/2010 | Kim .................. H04L 29/12358 370/254 |
| 2010/0223322 A1 | 9/2010 | Mott et al. |
| 2011/0004729 A1 | 1/2011 | Akkawi et al. |
| 2011/0093925 A1 | 4/2011 | Krishnamoorthy et al. |
| 2011/0238923 A1 | 9/2011 | Hooker et al. |
| 2012/0110108 A1 | 5/2012 | Li et al. |
| 2012/0155264 A1 | 6/2012 | Sharma et al. |
| 2013/0254325 A1 | 9/2013 | Song et al. |
| 2013/0263249 A1 | 10/2013 | Song et al. |
| 2014/0219284 A1 | 8/2014 | Chau et al. |
| 2014/0269413 A1 | 9/2014 | Hui et al. |
| 2014/0269716 A1 | 9/2014 | Pruss et al. |
| 2014/0278575 A1 | 9/2014 | Anton et al. |
| 2014/0331001 A1* | 11/2014 | Liu ........................ G06F 3/0659 711/103 |
| 2014/0362709 A1 | 12/2014 | Kashyap et al. |
| 2015/0195216 A1 | 7/2015 | Di Pietro et al. |
| 2015/0301949 A1 | 10/2015 | Koka et al. |
| 2015/0319243 A1* | 11/2015 | Hussain ................ G06F 3/0665 709/217 |
| 2015/0378919 A1 | 12/2015 | Anantaraman et al. |
| 2016/0050150 A1 | 2/2016 | Venkatesan et al. |
| 2016/0099872 A1 | 4/2016 | Kim et al. |
| 2016/0127492 A1* | 5/2016 | Malwankar ........... G06F 3/0614 709/212 |
| 2016/0156558 A1 | 6/2016 | Hong et al. |
| 2016/0216913 A1 | 7/2016 | Bosshart |
| 2016/0246507 A1 | 8/2016 | Bosshart |
| 2016/0246535 A1 | 8/2016 | Bosshart |
| 2016/0315964 A1 | 10/2016 | Shetty et al. |
| 2016/0323189 A1 | 11/2016 | Ahn et al. |
| 2017/0026292 A1 | 1/2017 | Smith et al. |
| 2017/0054618 A1 | 2/2017 | Kim |
| 2017/0054619 A1 | 2/2017 | Kim |
| 2017/0063690 A1 | 3/2017 | Bosshart |
| 2017/0064047 A1 | 3/2017 | Bosshart |
| 2017/0093707 A1 | 3/2017 | Kim et al. |
| 2017/0093986 A1 | 3/2017 | Kim et al. |
| 2017/0093987 A1 | 3/2017 | Kaushalram et al. |
| 2017/0187846 A1 | 6/2017 | Shalev et al. |
| 2017/0214599 A1* | 7/2017 | Seo ....................... H04L 41/0816 |
| 2017/0286363 A1 | 10/2017 | Joshua et al. |
| 2017/0371790 A1 | 12/2017 | Dwiel et al. |
| 2018/0034740 A1 | 2/2018 | Beliveau et al. |
| 2018/0060136 A1 | 3/2018 | Herdrich et al. |
| 2018/0121344 A1* | 5/2018 | Seo ....................... G06F 12/0246 |
| 2018/0167352 A1* | 6/2018 | Worley .................. H04L 69/22 |
| 2018/0173448 A1 | 6/2018 | Bosshart |
| 2018/0176324 A1 | 6/2018 | Kumar et al. |
| 2018/0234340 A1 | 8/2018 | Kim et al. |
| 2018/0234355 A1 | 8/2018 | Kim et al. |
| 2018/0239551 A1 | 8/2018 | Bosshart |
| 2018/0260135 A1* | 9/2018 | Hayashida ........... G06F 13/1673 |
| 2018/0260330 A1 | 9/2018 | Felter et al. |
| 2018/0262459 A1 | 9/2018 | Wang et al. |
| 2018/0285275 A1* | 10/2018 | Barczak ................ G06F 12/0871 |
| 2018/0329818 A1 | 11/2018 | Cheng et al. |
| 2018/0335953 A1 | 11/2018 | Ramaswamy et al. |
| 2018/0337860 A1 | 11/2018 | Kim et al. |
| 2018/0349163 A1 | 12/2018 | Gao et al. |
| 2018/0349285 A1* | 12/2018 | Ish ....................... G06F 12/0246 |
| 2019/0012278 A1 | 1/2019 | Sindhu et al. |

(56) References Cited

U.S. PATENT DOCUMENTS

| | | |
|---|---|---|
| 2019/0044878 A1 | 2/2019 | Steffen et al. |
| 2019/0050333 A1 | 2/2019 | Chacon et al. |
| 2019/0058646 A1 | 2/2019 | Kim et al. |
| 2019/0087341 A1 | 3/2019 | Pugsley et al. |
| 2019/0146675 A1* | 5/2019 | Subramanian ........ G06F 3/0607 711/170 |
| 2019/0146907 A1* | 5/2019 | Frolikov ............... G06F 3/0679 711/103 |
| 2019/0196987 A1 | 6/2019 | Shen et al. |
| 2019/0220429 A1* | 7/2019 | Ranjan .................. G06F 13/128 |
| 2019/0227921 A1* | 7/2019 | Frolikov ................ G06F 12/02 |
| 2019/0342785 A1 | 11/2019 | Li et al. |
| 2019/0354402 A1 | 11/2019 | Bivens et al. |
| 2019/0370176 A1 | 12/2019 | Priyadarshi et al. |
| 2019/0391928 A1* | 12/2019 | Lin ....................... G06F 12/109 |
| 2019/0394261 A1 | 12/2019 | DeCusatis et al. |
| 2020/0007408 A1 | 1/2020 | Siddappa |
| 2020/0065269 A1 | 2/2020 | Balasubramani et al. |
| 2020/0068014 A1 | 2/2020 | Sarkar et al. |
| 2020/0073553 A1* | 3/2020 | Klein ..................... G06F 3/0605 |
| 2020/0089619 A1* | 3/2020 | Hsu ...................... G06F 12/1009 |
| 2020/0097212 A1 | 3/2020 | Lakshman et al. |
| 2020/0151104 A1 | 5/2020 | Yang |
| 2020/0213156 A1 | 7/2020 | Cheng et al. |
| 2020/0226068 A1 | 7/2020 | Gellerich et al. |
| 2020/0233823 A1* | 7/2020 | Zhang .................... G06F 13/40 |
| 2020/0250099 A1 | 8/2020 | Campbell et al. |
| 2020/0293499 A1 | 9/2020 | Kohli et al. |
| 2020/0313999 A1 | 10/2020 | Lee et al. |
| 2020/0349080 A1 | 11/2020 | Radi et al. |
| 2020/0351370 A1 | 11/2020 | Radi et al. |
| 2020/0379668 A1* | 12/2020 | Akaike ................. G06F 3/0647 |
| 2021/0034250 A1* | 2/2021 | Mizuno ................ G06F 3/0614 |
| 2021/0034270 A1* | 2/2021 | Gupta ................... G06F 3/0679 |
| 2021/0049078 A1 | 2/2021 | Khan et al. |
| 2021/0051751 A1* | 2/2021 | Pawar .................... H04L 67/12 |
| 2021/0073086 A1 | 3/2021 | Subraya et al. |
| 2021/0141910 A1* | 5/2021 | Numata ................ G06F 21/604 |
| 2021/0149807 A1 | 5/2021 | Gupta et al. |
| 2021/0173589 A1* | 6/2021 | Benisty ................ G06F 13/4282 |
| 2021/0191727 A1* | 6/2021 | Jacob ..................... G06F 9/544 |
| 2021/0194828 A1* | 6/2021 | He ......................... H04L 47/33 |
| 2021/0218623 A1 | 7/2021 | Jain et al. |
| 2021/0247935 A1* | 8/2021 | Beygi .................... G06F 3/067 |
| 2021/0286540 A1* | 9/2021 | Tylik ..................... G06F 3/0659 |
| 2021/0294506 A1* | 9/2021 | Tadokoro .............. G06F 3/0631 |
| 2021/0311899 A1* | 10/2021 | Smith ................... G06F 13/4295 |
| 2021/0318828 A1* | 10/2021 | Valtonen ............... G06F 3/0652 |
| 2023/0145212 A1* | 5/2023 | Furey ..................... G06F 3/0659 711/154 |

OTHER PUBLICATIONS

Kim, et al.; "A Framework for Data Prefetching using Off-line Training of Markovian Predictors"; Sep. 18, 2002; 8 pages; available at https://www.comp.nus.edu.sg/~wongwf/papers/ICCD2002.pdf.

Eisley et al.; "In-Network Cache Coherence"; 2006; pp. 321-332; Proceedings of the 39th Annual IEEE/ACM International Symposium on Microarchitecture.

Jin et al.; "NetCache: Balancing Key-Value Stores with Fast In-Network Caching"; Oct. 28, 2017; pp. 121-136; Proceedings of the 26th Symposium on Operating Systems Principles.

Li et al.; "Pegasus: Load-Aware Selective Replication with an In-Network Coherence Directory"; Dec. 2018; 15 pages; Technical Report UW-CSE-18-12-01, University of Washington CSE, Seattle, WA.

Liu et al.; "IncBricks: Toward In-Network Computation with an In-Network Cache"; Apr. 2017; pp. 795-809; Acm Sigops Operating Systems Review 51, Jul. 26, No. 2.

Pending U.S. Appl. No. 16/697,019, filed Nov. 26, 2019, entitled "Fault Tolerant Data Coherence in Large-Scale Distributed Cache Systems", Marjan Radi et al.

Vestin et al.; "FastReact: In-Network Control and Caching for Industrial Control Networks using Programmable Data Planes"; Aug. 21, 2018; pp. 219-226; IEEE 23rd International Conference on Emerging Technologies and Factory Automation (ETFA). vol. 1.

Pending U.S. Appl. No. 16/548,116, filed Aug. 22, 2019, entitled "Distributed Cache With In-Network Prefetch", Marjan Radi et al.

Written Opinion dated Feb. 20, 2020 from International Application No. PCT/US2019/068360, 4 pages.

Botelho et al.; "On the Design of Practical Fault-Tolerant SDN Controllers"; Sep. 2014; 6 pages; available at: http://www.di.fc.ul.pt/~bessani/publications/ewsdn14-ftcontroller.pdf.

Huynh Tu Dang; "Consensus Protocols Exploiting Network Programmability"; Mar. 2019; 154 pages; available at: https://doc.rero.ch/record/324312/files/2019INFO003.pdf.

Jialin Li; "Co-Designing Distributed Systems with Programmable Network Hardware"; 2019; 205 pages; available at: https://digital.lib.washington.edu/researchworks/bitstream/handle/1773/44770/Li_washington_0250E_20677.pdf?sequence=1&isAllowed=y.

Liu et al.; "Circuit Switching Under the Radar with REACToR"; Apr. 2-4, 2014; 16 pages; USENIX; available at: https://www.usenix.org/system/files/conference/nsdi14/nsdi14-paper-liu_he.pdf.

Ivan Pepelnjak; Introduction to 802.1Qbb (Priority-based Flow Control-PFC); accessed on Jun. 25, 2020; available at: https://gestaltit.com/syndicated/ivan/introduction-802-1qbb-priority-based-flow-control-pfc/.

Juniper Networks Inc .; Configuring Priority-Based Flow Control for an EX Series Switch (CLI Procedure); Sep. 25, 2019; available at: https://www.juniper.net/documentation/en_US/junos/topics/task/configuration/cos-priority-flow-control-cli-ex-series.html.

Pending U.S. Appl. No. 16/914,206, filed Jun. 26, 2020, entitled "Devices and Methods for Managing Network Traffic for a Distributed Cache", Marjan Radi et al.

Wikipedia; Paxos (computer science); accessed on Jun. 27, 2020; available at: https://en.wikipedia.org/wiki/Paxos_(computer_science).

Paul Krzyzanowski; "Understanding Paxos"; PK.org; Distributed Systems; Nov. 1, 2018; available at: https://www.cs.rutgers.edu/~pxk/417/notes/paxos.html.

Leslie Lamport; "Paxos Made Simple"; Nov. 1, 2001; available at: https://lamport.azurewebsites.net/pubs/paxos-simple.pdf.

International Search Report and Written Opinion dated Apr. 27, 2020 from International Application No. PCT/US2019/068269, 6 pages.

Pending U.S. Appl. No. 16/916,730, filed Jun. 30, 2020, entitled "Devices and Methods for Failure Detection and Recovery for a Distributed Cache", Marjan Radi et al.

Cisco White Paper; "Intelligent Buffer Management on Cisco Nexus 9000 Series Switches"; Jun. 6, 2017; 22 pages; available at: https://www.cisco.com/c/en/us/products/collateral/switches/nexus-9000-series-switches/white-paper-c11-738488.html.

Pending U.S. Appl. No. 17/174,681, filed Feb. 12, 2021, entitled "Devices and Methods for Network Message Sequencing", Marjan Radi et al.

Liu et al.; "DistCache: provable load balancing for large-scale storage systems with distributed caching"; FAST '19: Proceedings of the 17th USENIX Conference on File and Storage Technologies; Feb. 2019; pp. 143-157 (Year 2019).

Radi et al.; "OmniXtend: direct to caches over commodity fabric"; 2019 IEEE Symposium on High-Performance Interconnects (HOTI); Santa Clara, CA; Aug. 2019; pp. 59-62 (Year 2019).

Wang et al.; "Concordia: Distributed Shared Memory with In-Network Cache Coherence"; 19th USENIX Conference on File and Storage Technologies; pp. 277-292; Feb. 2021.

International Search Report and Written Opinion dated Oct. 28, 2021 from International Application No. PCT/US2021/039070, 7 pages.

Ibrar et al.; "PrePass-Flow: A Machine Learning based Technique to Minimize ACL Policy Violation Due to Links Failure in Hybrid SDN"; Nov. 20, 2020; Computer Networks; available at https://doi.org/10.1016/j.comnet.2020.107706.

(56) References Cited

OTHER PUBLICATIONS

Saif et al.; "IOscope: A Flexible I/O Tracer for Workloads' I/O Pattern Characterization"; Jan. 25, 2019; International Conference on High Performance Computing; available at https://doi.org/10.1007/978-3-030-02465-9_7.

Zhang et al.; "PreFix Switch Failure Prediction in Datacenter Networks"; Mar. 2018; Proceedings of the ACM on the Measurement and Analysis of Computing Systems; available at: https://doi.org/10.1145/3179405.

Pending U.S. Appl. No. 17/353,781, filed Jun. 21, 2021, entitled "In-Network Failure Indication and Recovery", Marjan Radi et al.

Pending U.S. Appl. No. 17/331,453, filed May 26, 2021, entitled "Distributed Cache Management", Marjan Radi et al.

Stefanovici et al.; "Software-Defined Caching: Managing Caches in Multi-Tenant Data Centers"; Aug. 2015; pp. 174-181; SoCC '15: Proceedings of the Sixth ACM Symposium on Cloud Computing; available at: http://dx.doi.org/10.1145/2806777.2806933.

Mahmood et al.; "Efficient Caching through Stateful SDN in Named Data Networking"; Dec. 14, 2017; Transactions on Emerging Telecommunications Technologies; vol. 29, issue 1; available at: https://onlinelibrary.wiley.com/doi/abs/10.1002/ett.3271.

Liu et al.; "DistCache: Provable Load Balancing for Large-Scale Storage Systems with Distributed Caching"; Feb. 2019; Proceedings of the 17th USENIX Conference on File and Storage Technologies; available at: https://www.usenix.org/conference/fast19/presentation/liu.

International Search Report and Written Opinion dated Jun. 1, 2022 from International Application No. PCT/US2022/017608, 7 pages.

Intel Corporation; "In-Band Network Telemetry Detects Network Performance Issues"; White Paper, Dec. 18, 2020; available at: https://builders.intel.com/docs/networkbuilders/in-band-network-telemetry-detects-network-performance-issues.pdf.

Sabella et al.; "Using eBPF for network traffic analysis"; available at: Year: 2018; https://www.ntop.org/wp-content/uploads/2018/10/Sabella.pdf.

* cited by examiner

| Namespace ID | Physical Block | Accessing Node(s) |
|---|---|---|
| 1 | A | 108 A1 |
| 2 | B | 108 A3, 108 A2 |
| 3 | C | 108 B2 |
| 4 | D | 108 A6 |
| ... | ... | |
| m | N | 108 A3 |

MANAGEMENT OF NON-VOLATILE MEMORY EXPRESS NODES

CROSS-REFERENCE TO RELATED APPLICATIONS

This application claims the benefit of U.S. Provisional Application No. 63/127,423 titled "MANAGEMENT OF NON-VOLATILE MEMORY EXPRESS NODES", filed on Dec. 18, 2020, which is hereby incorporated by reference in its entirety. This application is related to U.S. application Ser. No. 16/548,116 titled "DISTRIBUTED CACHE WITH IN-NETWORK PREFETCH", filed on Aug. 22, 2019, and published as U.S. Patent Application Publication No. 2020/0349080 on Nov. 5, 2020, which is hereby incorporated by reference in its entirety. This application is also related to U.S. application Ser. No. 16/697,019 titled "FAULT TOLERANT DATA COHERENCE IN LARGE-SCALE DISTRIBUTED CACHE SYSTEMS", filed on Nov. 26, 2019, and published as U.S. Patent Application Publication No. 2020/0351370 on Nov. 5, 2020, which is hereby incorporated by reference in its entirety. This application is also related to U.S. application Ser. No. 16/914,206 titled "DEVICES AND METHODS FOR MANAGING NETWORK TRAFFIC FOR A DISTRIBUTED CACHE", filed on Jun. 26, 2020, which is hereby incorporated by reference in its entirety. This application is also related to U.S. application Ser. No. 16/916,730 titled "DEVICES AND METHODS FOR FAILURE DETECTION AND RECOVERY FOR A DISTRIBUTED CACHE", filed on Jun. 30, 2020, which is hereby incorporated by reference in its entirety. This application is also related to U.S. application Ser. No. 17/174,681, titled "DEVICES AND METHODS FOR NETWORK MESSAGE SEQUENCING", filed on Feb. 12, 2021, which is hereby incorporated by reference in its entirety.

BACKGROUND

Current trends in cloud computing, big data, and Input/Output (I/O) intensive applications have led to greater needs for high performance distributed shared memory systems in data centers in terms of low latency, high throughput, and bandwidth. Emerging high-performance Non-Volatile Memory express (NVMe) storage devices, such as Solid State Drives (SSDs), are becoming more common due to their increased performance in terms of Input/Output Operations Per Second (IOPS). Although NVMe was originally designed to be used with a Peripheral Component Interconnect express (PCIe) interface within a computer system, recent NVMe extensions such as NVMe over Fabric (NVMeoF) can support remote access to NVMe devices, such as with Remote Direct Memory Access (RDMA) (e.g., RDMA over Converged Ethernet (RoCE) and iWarp) and Fibre Channel (FC) transport fabrics.

Recent trends related to NVMe enables NVMe controllers to support hot-plugging and hot-unplugging of locally connected memory devices, such as SSDs, during runtime. This means that NVMe devices can be added or removed from the PCIe bus of a host during runtime without interrupting host operation or requiring the restarting of an NVMe controller. As fault-tolerance is an important part of developing Ethernet-based distributed systems, there is a need for handling of hot-plugging and hot-unplugging of NVMe devices in Ethernet-based distributed systems, such as in today's data centers that use NVMeoF/Transmission Control Protocol (TCP).

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Examples

Figure 1:
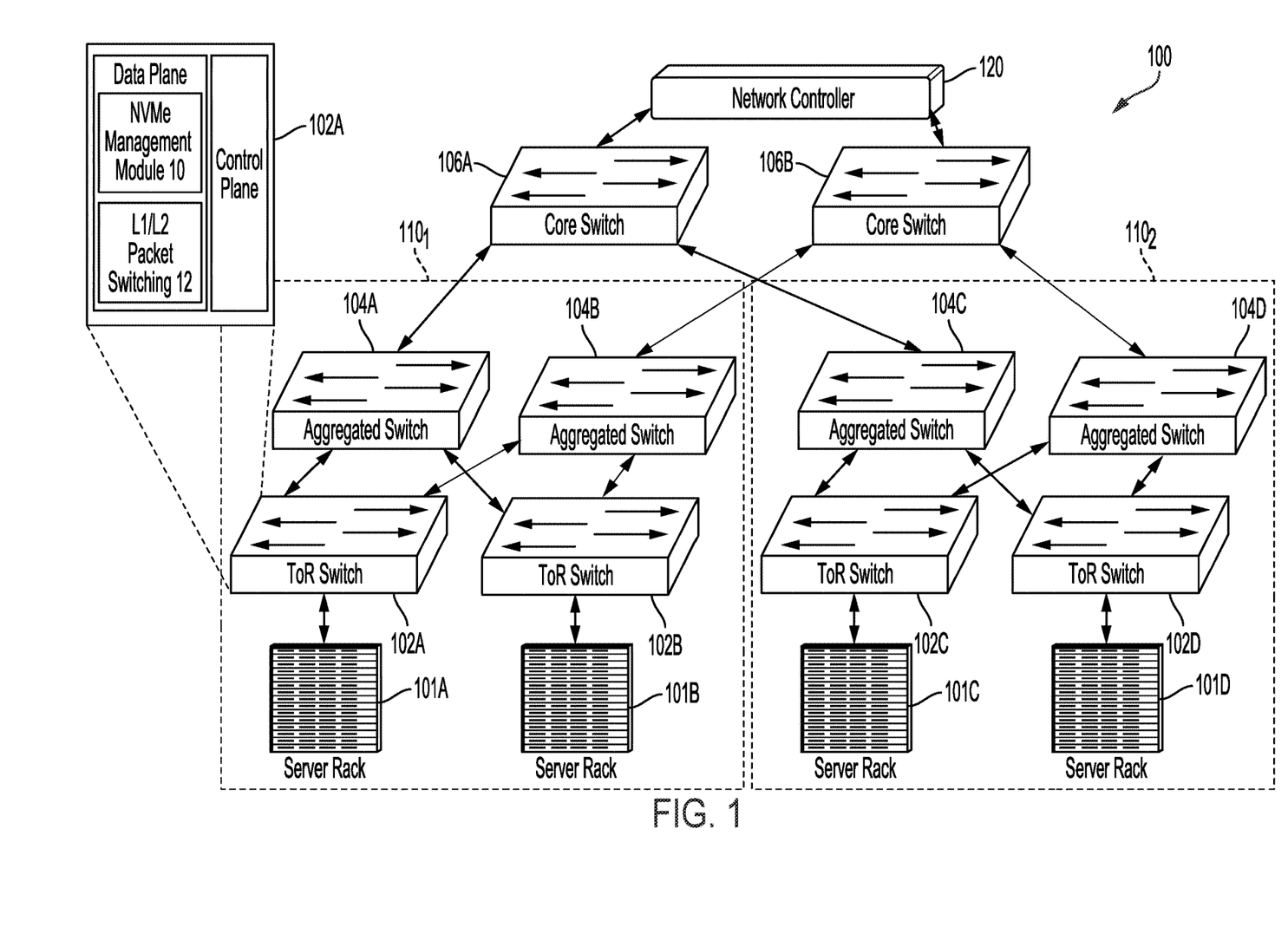
FIG. 1 illustrates an example network including Non-Volatile Memory express (NVMe) nodes, programmable switches, and a network controller according to one or more embodiments.

FIG. 1 illustrates an example network 100 for implementing Non-Volatile Memory express (NVMe) hot-plugging, hot-unplugging, and failure detection according to one or more embodiments. As used herein, hot-plugging refers to connecting an NVMe node during runtime without interrupting host operation or requiring the restarting of an NVMe controller, and hot-unplugging refers to disconnecting an NVMe node during runtime without interrupting host operation or requiring the restarting of an NVMe controller.

As shown in FIG. 1, server racks 101A, 101B, 101C, and 101D use Top of Rack (ToR) switches 102A, 102B, 102C, and 102D, respectively, to communicate with other devices in network 100. Each server rack 101 includes one or more NVMe nodes, such as NVMe node 108 in FIG. 2, that can access memory or storage locations in other NVMe nodes using NVMe messages, such as NVMe read and write commands. The NVMe nodes in server racks 101 can include, for example, servers or processing nodes, such as Reduced Instruction Set Computer (RISC)-V cores, and memory devices, such as Solid-State Drives (SSDs) or Hard Disk Drives (HDDs). In some implementations, network 100 in FIG. 1 may be used as at least part of a data center and/or for distributed processing, such as for distributed machine learning or big data analysis.

Network 100 can include, for example, a Storage Area Network (SAN), a Local Area Network (LAN), and/or a Wide Area Network (WAN), such as the Internet. In this regard, one or more of server racks 101, ToR switches 102, aggregated switches 104, core switches 106, and/or network controller 120 may not be physically co-located. Server racks 101, ToR switches 102, aggregated switches 104, core switches 106, and/or network controller 120 may communicate using one or more standards such as, for example, Ethernet.

As shown in the example of FIG. 1, each of server racks 101A, 101B, 101C, and 101D is connected to a ToR or edge switch 102. In other implementations, each rack 101 may communicate with multiple ToR or edge switches 102 for redundancy. ToR switches 102 can include programmable switches, such as 64 port ToR P4 programmable switches that route messages to and from NVMe nodes located in server racks 101. Such programmable switches can include, for example, a Barefoot Networks Tofino Application Specific Integrated Circuit (ASIC) with ports configured to provide 40 Gigabit Ethernet (GE) frame rates. Other types of programmable switches that can be used as a ToR switch 102 can include, for example, a Cavium Xpliant programmable switch or a Broadcom Trident 3 programmable switch. In some implementations, and as discussed in application Ser. Nos. 17/174,681, 16/697,019, 16/914,206, and 16/916,730 incorporated by reference above, each ToR switch 102 can provide centralized data coherency management for the data stored in the end node devices of its respective server rack 101, such as for a distributed cache.

Aggregated switches 104A and 104B route messages between ToR switches 102A and 102B for messages that remain in cluster 1101. In addition, aggregated switches 104A and 104B route messages from ToR switches 102A and 102B to core switches 106A and 106B for messages that travel between clusters 1101 and 1102. In the example of FIG. 1, racks 101A and 101B, ToR switches 102A and 102B, and aggregated switches 104A and 104B are grouped together as cluster 1101. Racks 101C and 101D, ToR switches 102C and 102D, and aggregated switches 104C and 104D are grouped together as cluster 1102.

Aggregated switches 104A, 104B, 104C, and 104D can include programmable switches, such as 64 port ToR P4 programmable switches that route messages to and from ToR switches 102 in their cluster 110. Such programmable switches can include, for example, a Barefoot Networks Tofino Application Specific Integrated Circuit (ASIC) with ports configured to provide 40 Gigabit Ethernet (GE) frame rates. Other types of programmable switches that can be used as an aggregated switch 104 can include, for example, a Cavium Xpliant programmable switch or a Broadcom Trident 3 programmable switch.

Core switches 106A and 106B provide communication between clusters 110, and with network controller 120. In some implementations, network controller 120 can include a Software Defined Networking (SDN) controller. As discussed in more detail below, network controller 120 can store a global mapping of active NVMe namespaces or logical blocks (e.g., global NVMe mapping 20 in FIG. 2) to physical blocks located in the NVMe nodes of server racks 101. An NVMe namespace can include a collection of logical addresses (e.g., Logical Block Addresses (LBAs)) that are available to being accessed by other NVMe nodes in network 100. Network controller 120 aggregates the available NVMe namespaces to create a global or network-wide view of available memory or storage capacity.

Network controller 120 updates its global mapping to add NVMe namespaces corresponding to new NVMe nodes that may have been hot-plugged into server racks 101, or to remove NVMe namespaces corresponding to NVMe nodes that may have been hot-unplugged from server racks 101 or determined by ToR switches 102 to be otherwise unavailable. In this regard, ToR switches 102 are configured to determine that an NVMe node in its rack 101 has become inactive, and to remove one or more namespaces associated with physical storage locations in the inactive NVMe node from an NVMe mapping (e.g., NVMe mapping 14 in FIGS. 2 and 3) stored at the ToR switch 102. Similarly, ToR switches 102 are configured to determine that a new NVMe node has been connected to a port, and to add one or more new NVMe namespaces to its NVMe mapping that are associated with physical storage locations in the new NVMe node. Each ToR switch can be configured to send notifications to network controller 120 in response to determining that an NVMe node within its rack 101 has been added, removed, or otherwise becomes unavailable, so that network controller 120 can update its global NVMe mapping.

In some implementations, ToR switches 102, aggregated switches 104, and core switches 106 can include, for example, programmable switches that can be programmed to handle different custom protocols. Programmable switches 102, 104, and 106 can include programmable match-action pipelines to provide a configurable data plane and customized packet processing capability. Examples of such programmable switches can be found in co-pending U.S. application Ser. Nos. 17/174,681, 16/548,116, 16/697,019, 16/914,206, and 16/916,730, which are incorporated by reference above.

Data planes of programmable switches 102, 104, and 106 in the example of FIG. 1 can control point-to-point packet forwarding behavior of the programmable switch, such as with L1/L2 Ethernet packet switching, packet admission control, and scheduling or queuing. Data planes of programmable switches 102, 104, and 106 are programmable and separate from higher-level control planes that determine end-to-end routes for packets or messages between devices in network 100.

In the example of FIG. 1, ToR switches 102 serve as NVMe controllers for the NVMe nodes in their respective server racks 101. In this regard, NVMe management module 10 is responsible for determining the active set of NVMe nodes in its server rack 101 by identifying newly attached, failed, or recovered NVMe nodes, and updating the available namespaces in its NVMe mapping. In addition, NVMe management module 10 can inform the other NVMe nodes and network controller 120 of updates in the NVMe mappings. In more detail, ToR switches 102 monitor the status of their ports for activation or deactivation of the ports. The activation of a port triggers NVMe management module 10 to perform an NVMe discovery process via the activated port to determine whether there are one or more newly available namespaces. The deactivation of a port triggers NVMe management module 10 to cancel use of any NVMe nodes connected to the deactivated port and all outgoing messages for such NVMe nodes.

In addition, the use of a programmable switch as an NVMe controller can provide for the configuration of high-performance and scalable memory centric architectures by defining customized packet formats and processing behavior. Programmable switches 102, 104, and 106 enable a protocol-independent switch architecture and the use of off-the-shelf switches, as opposed to specially designed Networks on a Chip (NoCs). The processing resources of programmable switches 102, 104, and 106, such as the use of Content Addressable Memory (CAM) or Ternary CAM (TCAM) tables, or other types of match-action tables, can ordinarily provide faster processing of NVMe messages than can occur at the end NVMe nodes.

Those of ordinary skill in the art will appreciate with reference to the present disclosure that other implementations may include a different number or arrangement of server racks 101, ToR switches 102, aggregated switches 104, or core switches 106 than shown in the example of FIG. 1. In this regard, network 100 shown in FIG. 1 is for the purposes of illustration, and those of ordinary skill in the art will appreciate that network 100 may include many more server racks 101, and switches or routers than shown in the example of FIG. 1. Other implementations may include additional levels in network 100 that may include additional servers and/or programmable switches. In some variations, aggregated switches 104 and/or core switches 106 may be omitted.

Figure 2:
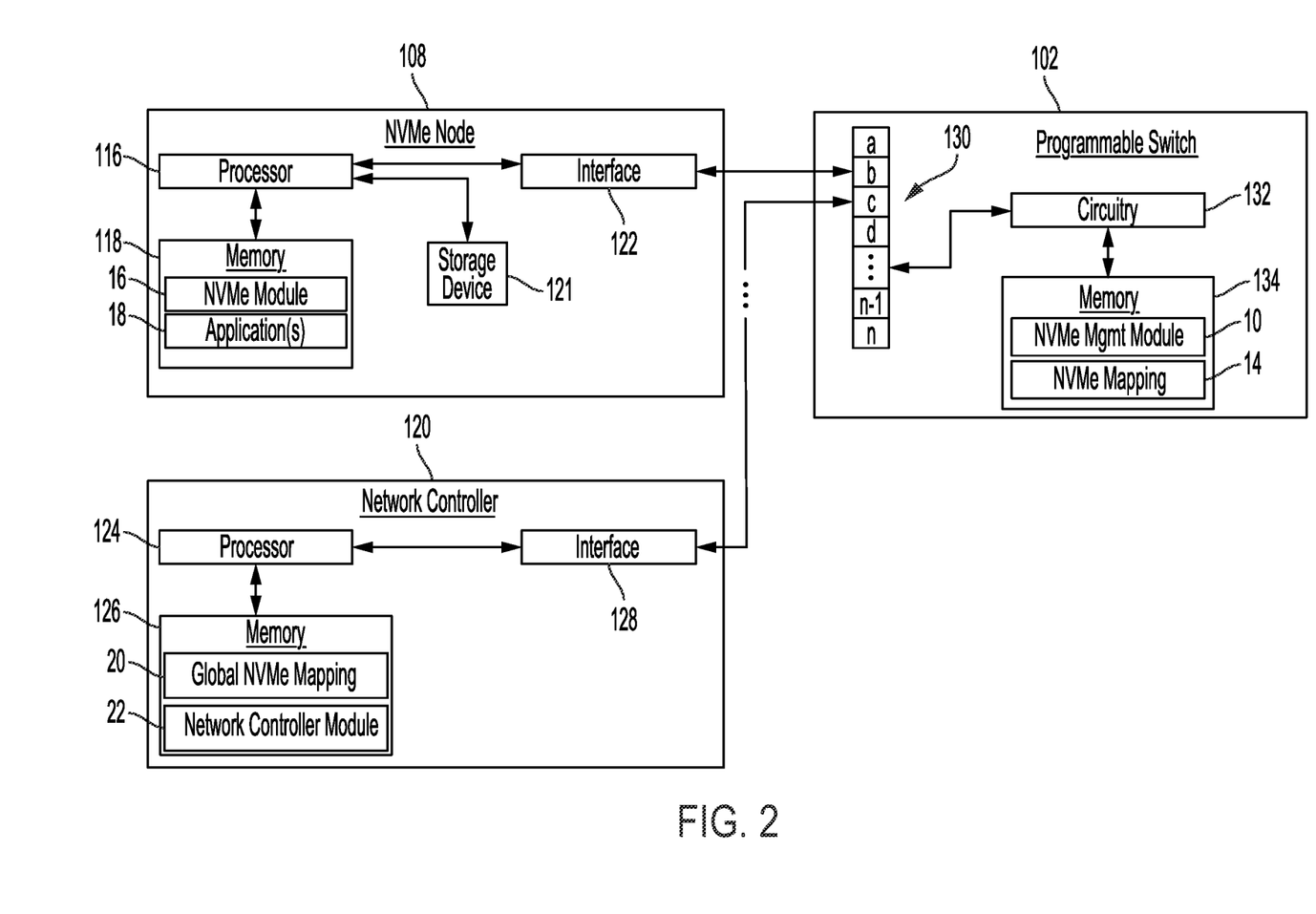
FIG. 2 is a block diagram of example components included in the network of FIG. 1 according to one or more embodiments.

FIG. 2 is a block diagram of example components included in network 100 of FIG. 1 according to one or more embodiments. As shown in FIG. 2, NVMe node 108 includes processor 116, memory 118, storage device 121, and interface 122 for communicating on network 100. NVMe node 108 may be included as part of server rack 101A, for example, in FIG. 1. Although only NVMe node 108 is shown in the example of FIG. 2, other NVMe nodes in network 100 may have similar or different components as NVMe node 108.

Processor 116 can execute instructions, such as instructions from NVMe module 16, and application(s) 18, which may include an Operating System (OS) and/or other applications used by NVMe node 108. Processor 116 can include circuitry such as a Central Processing Unit (CPU), one or more RISC-V cores, a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 116 can include a System on a Chip (SoC), which may be combined with one or both of memory 118 and interface 122.

Memory 118 can include, for example, a volatile Random Access Memory (RAM) such as Static RAM (SRAM), Dynamic RAM (DRAM), a non-volatile RAM, or other solid-state memory that is used by processor 116 as an internal main memory to store data. Data stored in memory 118 can include data read from storage device 121, data to be stored in storage device 121, instructions loaded from NVMe module 16 or application(s) 18 for execution by processor 116, and/or data used in executing such applications. In addition to loading data from memory 118, processor 116 may also load data from NVMe namespaces of other NVMe nodes as an external memory or distributed cache. Such data may also be flushed after modification by processor 116 or evicted without modification back to memory 118 or an external NVMe node via programmable switch 102.

As shown in FIG. 2, memory 118 stores NVMe module 16, which can provide instructions for accessing data in an NVMe namespace. Such instructions can include a protocol for maintaining coherency of data (e.g., cache lines) stored on different NVMe nodes of network 100 and handling communications with programmable switch 102, such as for maintaining a proper sequence of NVMe messages. In some implementations, NVMe module 16 can include a driver used by an OS of NVMe node 108.

Storage device 121 serves as secondary storage that can include, for example, one or more rotating magnetic disks or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

Interface 122 is configured to interface NVMe node 108 with programmable switch 102. Interface 122 may communicate using a standard such as, for example, Ethernet. In this regard, NVMe node 108, programmable switch 102, and network controller 120 may not be physically co-located and may communicate over a network such as a LAN or a WAN. As will be appreciated by those of ordinary skill in the art, interface 122 can be included as part of processor 116.

As discussed above with reference to FIG. 1, programmable switch 102 can be a ToR switch for a server rack 101 including NVMe node 108. In the example of FIG. 2, programmable switch 102 includes ports 130, circuitry 132, and memory 134. Ports 130 provide a connection and are configured to communicate with devices, such as NVMe nodes, network controller 120, aggregated switches 104, and core switches 106. For example, ports 130 may include Ethernet ports. As discussed above, ports 130 can be monitored to detect the activation or deactivation of a port to trigger NVMe management module 10 to perform an NVMe discovery process or remove NVMe namespaces for a deactivated port.

Memory 134 of programmable switch 102 can include, for example, a volatile RAM such as DRAM, or a non-volatile RAM or other solid-state memory such as register arrays that are used by circuitry 132 to execute instructions loaded from NVMe management module 10 or firmware of programmable switch 102, and/or data used in executing such instructions, such as NVMe mapping 14. Circuitry 132 can include circuitry such an ASIC, a microcontroller, a DSP, an FPGA, hard-wired logic, analog circuitry and/or a combination thereof. In some implementations, circuitry 132 can include an SoC, which may be combined with memory 134.

As discussed in more detail below, NVMe management module 10 can include instructions for implementing processes such as those discussed with reference to FIGS. 4 to 6 to enable hot-plugging and hot-unplugging of NVMe nodes, and improved message failure handling. In addition, the use of NVMe mapping 14 enables programmable switch 102 to keep track of active NVMe namespaces available at NVMe nodes in its server rack.

Network controller 120 in the example of FIG. 2 maintains global NVMe mapping 20, which may include a mapping table or other type of data structure. Controller 120 receives NVMe mapping updates or notifications from programmable switches 102 via interface 128 indicating updates or changes to the NVMe mapping maintained by the programmable switches 102, such as NVMe mapping 14. Such updates can include the removal of one or more NVMe namespaces associated with physical storage locations located in an NVMe node determined to be inactive or otherwise unavailable, such as due to hot-unplugging. Similarly, programmable switch 102 may update its NVMe mapping to add one or more new NVMe namespaces that become available, such as due to hot-plugging of an NVMe node.

In addition, network controller 120 may send one or more notifications to NVMe nodes in network 100 to notify such nodes that a new namespace is available or that an NVMe namespace has become unavailable. In some implementations, global NVMe mapping 20 maintained by controller 120 can indicate which NVMe nodes have accessed a particular namespace. In such implementations, network controller 120 may identify such NVMe nodes that have accessed a removed NVMe namespace that are not in the same server rack as the programmable switch 102 sending the update. Controller 120 can then send a notification to such NVMe nodes to notify them of the unavailable NVMe namespace.

Processor 124 of controller 120 executes network controller module 22 to maintain global NVMe mapping 20 and notify NVMe nodes of updates, as needed. Processor 124 can include circuitry such as a CPU, a GPU, a microcontroller, a DSP, an ASIC, an FPGA, hard-wired logic, analog circuitry and/or a combination thereof. In some implementations, processor 124 can include an SoC, which may be combined with one or both of memory 126 and interface 128. Memory 126 can include, for example, a volatile RAM such as DRAM, a non-volatile RAM, or other solid-state memory that is used by processor 124 to store data. Controller 120 communicates with programmable switches 102 via interface 128, which is configured to interface with ports of programmable switches 102, and may interface according to a standard, such as Ethernet.

As will be appreciated by those of ordinary skill in the art with reference to the present disclosure, other implementations may include a different arrangement or number of components, or modules than shown in the example of FIG. 2. For example, in some implementations, NVMe node 108 may not include storage device 121, or two programmable switches 102 may be used for a single server rack for redundancy.

Figure 3:
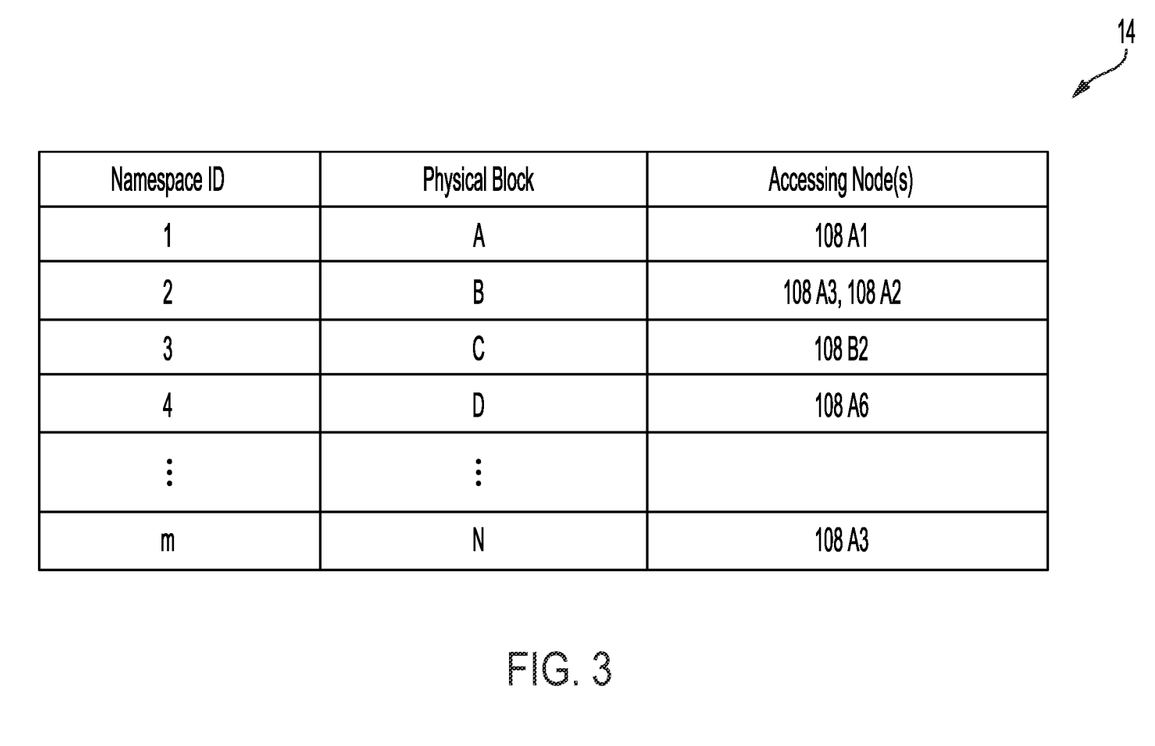
FIG. 3 illustrates an example NVMe mapping according to one or more embodiments.

FIG. 3 illustrates an example NVMe mapping 14 according to one or more embodiments. In the example of FIG. 3, NVMe mapping 14 may be a mapping table or other type of data structure. For example, NVMe mapping can include a single data structure or may be formed of multiple data structures stored at a programmable switch 102, which may include a memory directly connected to and used by programmable switch 102 (e.g., memory 134 in FIG. 2).

As shown in FIG. 3, NVMe mapping 14 includes NVMe namespace identifiers (i.e., namespace IDs in FIG. 3) that are mapped as logical blocks to physical storage locations (i.e., physical blocks in FIG. 3) located in an NVMe node. The physical blocks may each represent a range of physical storage locations in NVMe nodes included in the same server rack as the programmable switch 102 storing NVMe mapping 14. In some implementations, each NVMe node 108 in a server rack may include one or more NVMe namespaces. In other cases, less than all of the nodes or servers in the server rack may have available NVMe namespaces.

In the example of FIG. 3, NVMe mapping 14 includes identifiers for NVMe nodes that may be in the same server rack and/or in other server racks that have accessed a particular NVMe namespace. As discussed in more detail below with reference to the processes of FIGS. 4 and 5, the programmable switch 102 may send notifications to the NVMe nodes that have accessed an NVMe namespace after the namespace becomes unavailable, such as due to an NVMe node being hot-unplugged. In other implementations, the accessing nodes for each NVMe namespace may be omitted.

The programmable switch 102 can expose or otherwise make available the NVMe namespaces in its server rack, and provide a storage capacity for the NVMe namespaces. In some implementations, NVMe nodes may request a list of available NVMe namespaces from the programmable switch 102.

NVMe mapping 14 can be updated by the programmable switch 102 to add new NVMe namespaces responsive to new NVMe nodes (e.g., NVMe node 108 in FIG. 2) being added to the server rack, such as due to hot-plugging. Similarly, NVMe mapping 14 can be updated by the programmable switch 102 to remove unavailable NVMe namespaces, such as due to hot-unplugging of an NVMe node from the server rack. In this regard, the programmable switch 102 can detect the hot-plugging or hot-unplugging of NVMe nodes 108 via the monitoring of its ports 130 that are connected to the NVMe nodes 108. In some implementations, the programmable switch 102 can also remove one or more NVMe namespaces in response to determining that an NVMe node 108 is not available, such as after resending a threshold number of messages to an NVMe node without receiving an acknowledgment of the message.

As will be appreciated by those of ordinary skill in the art in light of the present disclosure, NVMe mapping 14 may include different information than shown in FIG. 3. For example, some implementations of NVMe mapping 14 may include a logical address range for each namespace or may omit the accessing nodes column.

Example Processes

Figure 4:
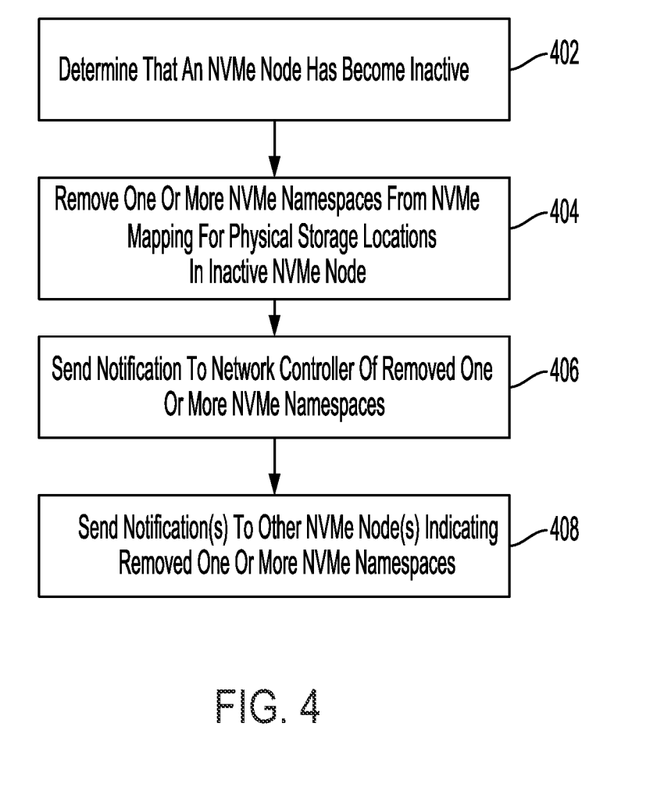
FIG. 4 is a flowchart for an NVMe namespace removal process according to one or more embodiments.

FIG. 4 is a flowchart for an NVMe namespace removal process according to one or more embodiments. The process of FIG. 4 may be performed by, for example, circuitry 132 of programmable switch 102 executing NVMe management module 10 in FIG. 2.

In block 402, the programmable switch determines that an NVMe node has become inactive. This determination may derive from the detection of the deactivation of a port of the programmable switch or the removal of a connection to an NVMe node via the port. In other cases, the determination that an NVMe node has become inactive may derive from reaching a predetermined number of successive unacknowledged messages sent to the inactive NVMe node. The use of a programmable switch (e.g., a programmable ToR switch) to determine that an NVMe node has become inactive can provide for faster detection of hot-unplugging and failure detection of an NVMe node than relying on the end NVMe nodes to determine that the inactive NVMe node is no longer available.

In block 404, the programmable switch removes one or more NVMe namespaces from an NVMe mapping that are associated with physical storage locations in the inactive NVMe node. In this regard, each NVMe node may have one or more NVMe namespaces, such that when an NVMe node becomes inactive, a corresponding one or more NVMe namespaces are removed from the NVMe mapping for the unavailable physical storage locations. In some implementations, the one or more NVMe namespaces may be removed from the NVMe mapping by deleting an entry or entries for the NVMe namespace. In other implementations, the one or more NVMe namespaces may be removed by adding an inactive flag or other indicator that the NVMe namespace or namespaces have been removed. Such removed NVMe namespaces may eventually be deleted in response to reaching a storage limit for the NVMe mapping. Using such an inactive indication may facilitate notifying NVMe nodes that previously accessed the inactive NVMe namespace in response to the NVMe namespace later becoming active.

In block 406, the programmable switch sends a notification to network controller 120 indicating the removal of the one or more NVMe namespaces from the NVMe mapping in block 404. As discussed in more detail below with reference to FIG. 7, network controller 120 can use the notification sent in block 408 to update a global NVMe mapping (i.e., global NVMe mapping 20 in FIG. 2), and may notify other programmable switches 102 and/or NVMe nodes 108 of the update.

In block 408, the programmable switch sends one or more notifications to one or more NVMe nodes indicating the removed NVMe namespaces. The NVMe nodes may be in the same server rack or in different server racks. As discussed above, the programmable switch 102 may use a listing of NVMe nodes that have previously accessed the removed NVMe namespace to send the notifications to only those NVMe nodes indicating the removal of the NVMe namespace. This can ordinarily provide for a quicker adjustment made by the NVMe nodes to use different available NVMe namespaces in place of the removed NVMe namespaces than relying upon the end nodes to determine that the NVMe namespace is no longer available.

Those of ordinary skill in the art will appreciate with reference to the present disclosure that the order of blocks for the NVMe namespace removal process of FIG. 4 may differ in other implementations. For example, in other implementations, the order of blocks 406 and 408 may be switched so that the NVMe nodes are notified of the removal of the NVMe namespace before the network controller 120 is notified of the removal of the NVMe namespace. In yet other implementations, one of blocks 406 or 408 may be omitted such that the NVMe nodes that previously accessed the removed NVMe namespace may only be notified by network controller 120 or by the programmable switch.

Figure 5:
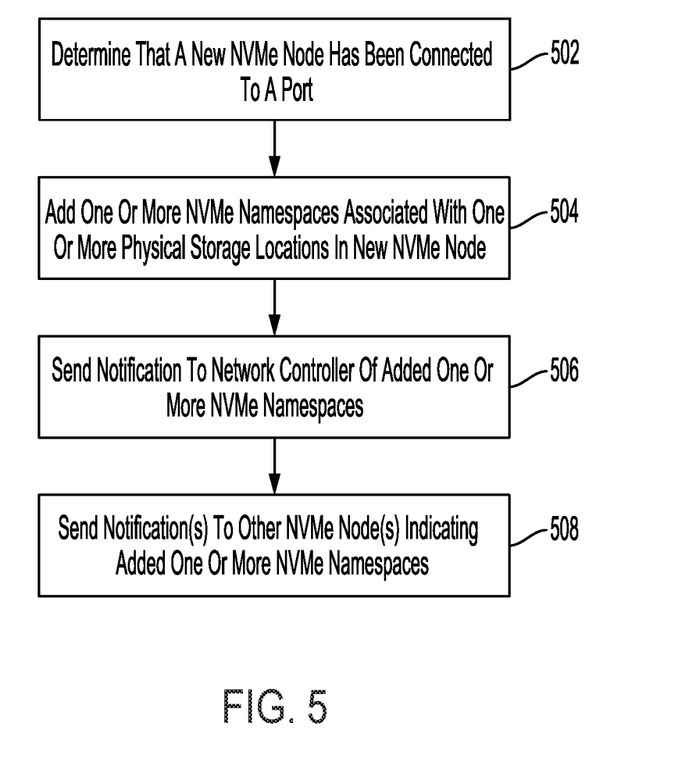
FIG. 5 is a flowchart for an NVMe namespace addition process according to one or more embodiments.

FIG. 5 is a flowchart for an NVMe namespace addition process according to one or more embodiments. The process of FIG. 5 may be performed by, for example, circuitry 132 of programmable switch 102 executing NVMe management module 10 in FIG. 2.

In block 502, the programmable switch determines that a new NVMe node has been connected to a port, such as in response to an NVMe node being connected to the programmable switch during runtime via hot-plugging. The determination in block 502 may also occur during a startup process of the programmable switch, where the programmable switch performs an NVMe discovery process via all ports to identify available NVMe namespaces located at the NVMe nodes connected to the programmable switch via its ports.

In block 504, the programmable switch adds one or more NVMe namespaces associated with one or more physical storage locations in the new NVMe node. In some implementations, the programmable switch may send an NVMe request for available namespaces to the new NVMe node detected in block 502.

In block 506, the programmable switch sends a notification to network controller 120 of the added one or more NVMe namespaces. The network controller 120 may then update its global NVMe mapping 20, and may notify other programmable switches 102 and/or NVMe nodes 108 of the update.

In block 508, the programmable switch sends one or more notifications to one or more NVMe nodes indicating the added NVMe namespaces. The NVMe nodes may be in the same server rack or in different server racks. In some implementations, the programmable switch can send a notification of the added NVMe namespaces to each NVMe node in its server rack. In other implementations, the programmable switch may also send notifications to other NVMe nodes that have previously accessed NVMe namespaces in the server rack.

Those of ordinary skill in the art will appreciate with reference to the present disclosure that the order of blocks for the NVMe namespace addition process of FIG. 5 may differ in other implementations. For example, in other implementations, the order of blocks 506 and 508 may be switched so that the NVMe nodes are notified of the addition of the one or more NVMe namespaces before the network controller 120 is notified of the addition of the one or more NVMe namespaces. In yet other implementations, one of blocks 506 or 508 may be omitted such that only the programmable switch 102 or the network controller 120 may notify NVMe nodes of the addition of one or more NVMe namespaces.

Figure 6:
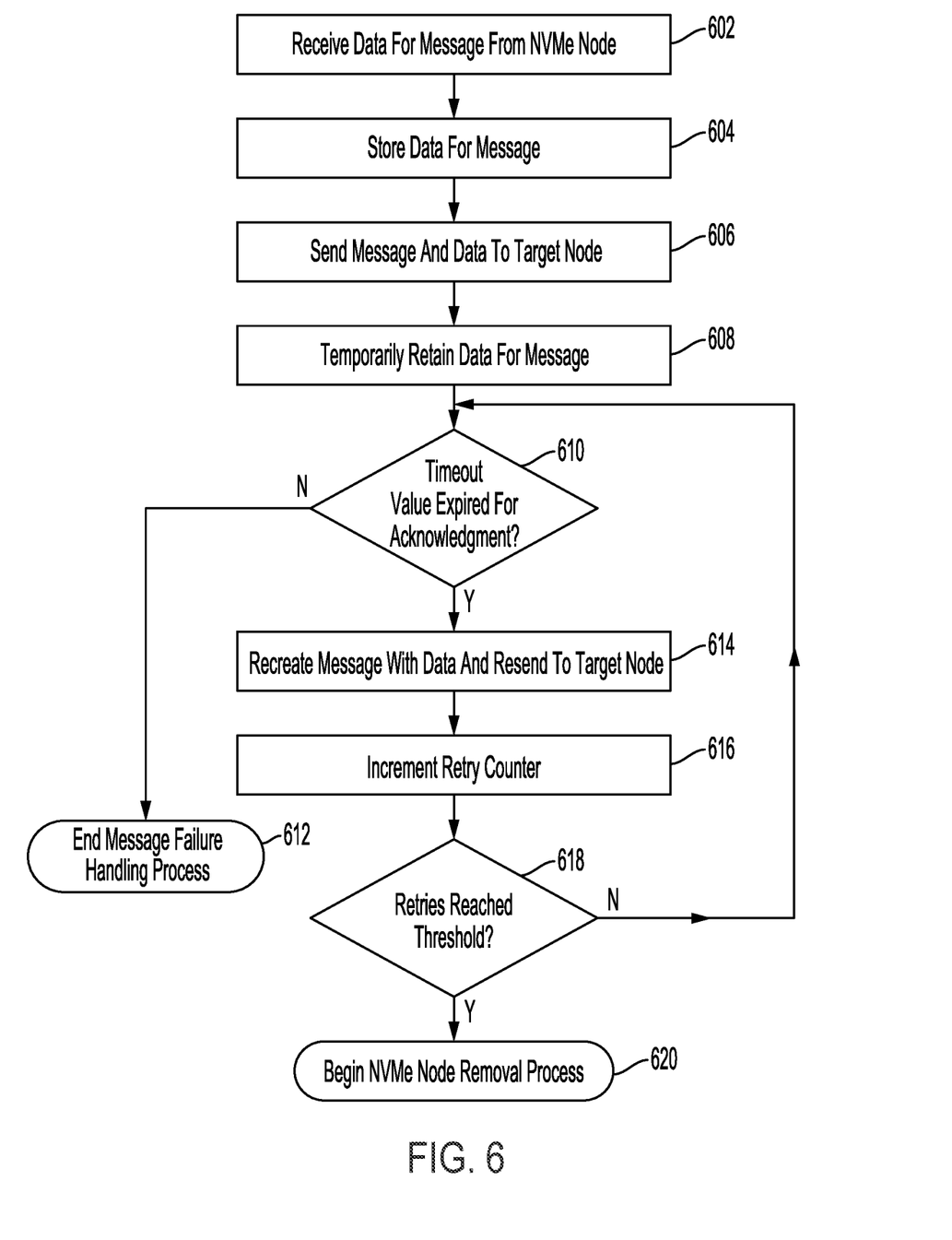
FIG. 6 is a flowchart for a message failure handling process according to one or more embodiments.

FIG. 6 is a flowchart for a message failure handling process according to one or more embodiments. The process of FIG. 6 may be performed by, for example, circuitry 132 of programmable switch 102 executing NVMe management module 10 in FIG. 2.

In block 602, the programmable switch receives data for a message from an NVMe node in its server rack. The data may include, for example, data for performing an NVMe write command at a target NVMe node within the same server rack or in a different server rack. As another example, the data may include data that was read from an NVMe node in the server rack in response to a read command received from another NVMe node.

In block 604, the programmable switch locally stores the data received for the message, such as in memory 134 in programmable switch 102 in FIG. 2. In some implementations, the programmable switch may parse the data from the message received from the NVMe node, and buffer an NVMe capsule contained in the message, or store a copy of the data representing a payload in the local memory. The storage of the data for the message can result from, for example, one or more match-action stages or tables of the programmable switch.

In block 606, the programmable switch sends the message including the data to the target node. In this regard, the programmable switch can parse one or more headers of the message to identify the target node and use one or more match-action stages or tables to route the message to an appropriate port for sending the message to the target NVMe node.

In block 608, the programmable switch temporarily retains the data stored in block 604 in case an acknowledgment is not received and the message needs to be resent. By performing such message failure handling at the programmable switch, it is ordinarily possible to reduce the time needed to respond to a failed message and reduce the workload of the end NVMe nodes in handling such failed messages. In some implementations, the programmable switch may retain the data until an acknowledgment is received for the data. In other implementations, the data may be temporarily stored in a circular buffer such that the oldest data received by the programmable switch is replaced by the most recent data received by the programmable switch when the buffer becomes full.

In block 610, the programmable switch determines whether a timeout value has expired for receiving an acknowledgment (i.e., an ACK message) from the target node for the message sent in block 606. In some implementations, the programmable switch can set a timeout register responsive to sending the message, such as by an egress pipeline of the programmable switch, for receiving a corresponding acknowledgment. The timeout value can be based on, for example, an average roundtrip packet transmission duration. In some implementations, the timeout value may be adjusted in the field based on, for example, an exponential moving average of sampled round trip times.

In response to an acknowledgment being received in block 610 before the timeout value is reached, the message failure handling process of FIG. 6 ends in block 612. On the other hand, in response to no acknowledgment being received in block 610 before the timeout value is reached, the process proceeds to block 614 to recreate and resend the message using the data temporarily retained by the programmable switch in block 608. By using the locally stored data, the programmable switch can quickly respond to the timeout value being reached without having to notify the NVMe node that originated the message and wait for a response from the NVMe node.

In some cases, the programmable switch may receive a negative-acknowledgment (i.e., a NACK message) or other error message indicating an error in receiving the message sent by the programmable switch for reasons, such as having an incorrect sequence number. In such cases, the programmable switch may attempt to correct the error in recreating the message. In some implementations, the programmable switch may also notify the NVMe node that originated the message for errors that cannot be resolved by the programmable switch.

In block 616, the programmable switch increments a message retry counter. The counter may be set in, for example, a register of the programmable switch responsive to the message being resent, such as by an egress pipeline of the programmable switch.

In block 618, the programmable switch determines whether the number of retries has reached a threshold value. The threshold number of retries may be set, for example, as part of an NVMe negotiation process between the sending and receiving NVMe nodes. In response to the number of retries reaching the threshold value, the process of FIG. 6 proceeds to block 620 to begin an NVMe namespace removal process, such as the process of FIG. 4 discussed above, to remove an NVMe namespace of the unresponsive NVMe node from an NVMe mapping of the programmable switch. On the other hand, in response to the threshold number of retries not being reached in block 618, the process returns to block 610 to determine whether the timeout value has been reached for receiving an acknowledgment of the message resent in block 614.

Those of ordinary skill in the art will appreciate with reference to the present disclosure that the order of blocks for the message failure handling process of FIG. 6 may differ in other implementations. For example, in some implementations, incrementing the retry counter in block 616 may occur before recreating or resending the message in block 614.

Figure 7:
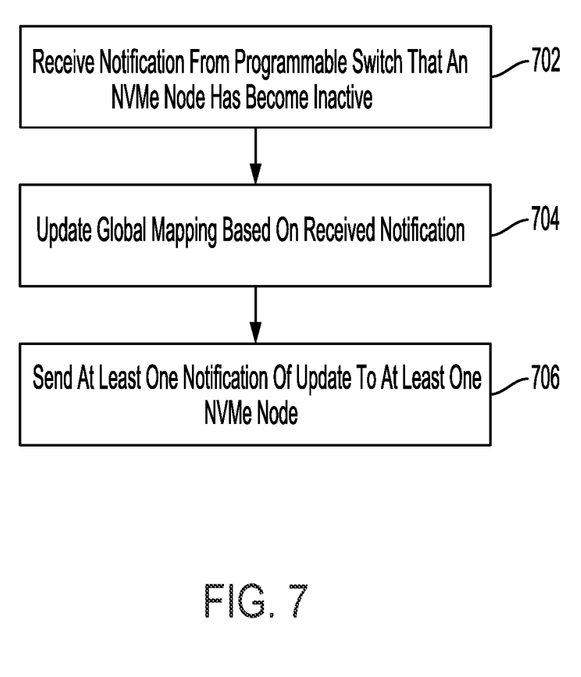
FIG. 7 is a flowchart for a global NVMe mapping update process according to one or more embodiments.

FIG. 7 is a flowchart for a global NVMe mapping update process according to one or more embodiments. The process of FIG. 7 may be performed by, for example, processor 124 of network controller 120 executing network controller module 22 in FIG. 2.

In block 702, the network controller receives a notification from a programmable switch (e.g., one of ToR switches 102A, 102B, 102C, or 102D in FIG. 1) that an NVMe node has become inactive. The notification may be sent as part of an NVMe namespace removal process, such as the process of FIG. 5 discussed above. In other implementations, the network controller may also receive updates from programmable switches on newly added NVMe namespaces.

In block 704, the network controller updates a global mapping (e.g., global NVMe mapping 20 in FIG. 2) based on the received notification. The network controller can remove one or more NVMe namespaces from its global mapping that correspond to the inactive NVMe node. In some implementations, the one or more NVMe namespaces may be removed by deleting the entry or entries for the NVMe namespace. In other implementations, the one or more NVMe namespaces may be removed by adding an inactive flag or other indicator that the NVMe namespace or namespaces have been removed.

In block 706, the network controller sends at least one notification of the update to the global mapping to at least one NVMe node. The global mapping may include entries or indications of NVMe nodes that have accessed one or more NVMe namespaces removed from the global mapping. This information may be provided by the programmable switches in the network on a periodic basis or in response to a new NVMe node accessing an NVMe namespace, for example. The network controller may then send notifications to the NVMe nodes that have previously accessed data, to read data from the namespace and/or write data to the namespace, to notify the NVMe nodes that the one or more namespaces removed from the global mapping are no longer available.

In some implementations, in response to the network controller receiving an update from a programmable switch that the NVMe node has become active again, the network controller may then send a new notification to the NVMe nodes that had previously accessed the NVMe namespace or namespaces of the reactivated NVMe node. In this regard, removing an NVMe namespace from the global mapping may only include adding an inactive flag or indicator to an entry or entries for the inactive NVMe namespace in the global mapping. Such removed NVMe namespaces may eventually be deleted in response to reaching a storage limit for the global mapping. Using such an inactive indication may facilitate notifying NVMe nodes that previously accessed the removed NVMe namespace in response to the NVMe namespace later becoming active.

Those of ordinary skill in the art will appreciate with reference to the present disclosure that the order of blocks for the global NVMe mapping update process of FIG. 7 may differ in other implementations. For example, in some implementations, sending the at least one notification of the update in block 706 may precede the update to the global mapping in block 704.

As discussed above, the use of in-line programmable switches to maintain an NVMe mapping can ordinarily enable hot-plugging and hot-unplugging of NVMe nodes in a network. In addition, the foregoing message handling processes can provide for faster detection of failures and improve fault tolerance, which can be especially useful in Ethernet networks that are inherently lossy. The use of programmable switches for NVMe mapping can facilitate faster mapping updates than relying on communications between NVMe end nodes, while offloading such processing from the NVMe nodes. As discussed above, the faster NVMe mapping updates can be due to the port monitoring performed by the programmable switches, programmable match-action stages or tables, and in-line or in-network processing.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A method performed by a programmable switch, the method comprising:
    storing, at the programmable switch, a mapping of Non-Volatile Memory express (NVMe) namespaces to physical storage locations located in a plurality of NVMe nodes,
    wherein each NVMe node of the plurality of NVMe nodes is a separate physical device configured to communicate on a network using NVMe over Fabric (NVMeOF);
    determining that an NVMe node of the plurality of NVMe nodes has become inactive;
    removing one or more NVMe namespaces from the stored mapping associated with one or more physical storage locations located in the inactive NVMe node; and
    sending at least one notification to at least one other NVMe node of the plurality of NVMe nodes indicating that the one or more NVMe namespaces have been removed from the mapping.

2. The method of claim 1, further comprising determining that the NVMe node has become inactive based on at least one of detecting inactivity of a port of the programmable switch that is connected to the inactive NVMe node and reaching a predetermined number of successive unacknowledged messages sent to the inactive NVMe node.

3. The method of claim 1, further comprising:
    determining that a new NVMe node has been connected to a port of the programmable switch; and
    adding one or more new NVMe namespaces to the mapping that are associated with one or more new physical storage locations in the new NVMe node.

4. The method of claim 1, further comprising temporarily retaining data sent to a target NVMe node after sending the data in a message to the target NVMe node.

5. The method of claim 1, further comprising:
    sending a message to a target NVMe node of the plurality of NVMe nodes;
    determining whether a timeout value has been reached for receiving an acknowledgment of the sent message from the target NVMe node; and
    in response to the timeout value being reached without receiving the acknowledgment from the target NVMe node, resending the message to the target NVMe node.

6. The method of claim 1, wherein the mapping indicates NVMe nodes of the plurality of NVMe nodes that have accessed data in a particular NVMe namespace.

7. The method of claim 1, further comprising sending a notification to a network controller of the removed one or more NVMe namespaces to update a global mapping of active NVMe namespaces to NVMe nodes in the network.

8. The method of claim 1, wherein the programmable switch is a Top of Rack (ToR) switch for the plurality of NVMe nodes.

9. The method of claim 1, further comprising:
    detecting the activation of a port of the programmable switch; and
    in response to detecting the activation of the port, performing an NVMe discovery service to determine whether one or more new NVMe namespaces are available via the activated port.

10. A programmable switch, comprising:
    a plurality of ports configured to communicate with a plurality of Non-Volatile Memory express (NVMe) nodes via a network, wherein each NVMe node of the plurality of NVMe nodes is configured to communicate on the network using NVMe over Fabric (NVMeOF);

at least one memory configured to store a mapping of NVMe namespaces to physical storage locations located in the plurality of NVMe nodes; and circuitry configured to:
determine that an NVMe node of the plurality of NVMe nodes has become inactive by detecting a removal of a connection to the NVMe node via a port of the plurality of ports;

remove, from the mapping, one or more NVMe namespaces associated with one or more physical storage locations located in the inactive NVMe node; and send, via the network, at least one notification to at least one other NVMe node of the plurality of NVMe nodes indicating that the one or more NVMe namespaces have been removed from the mapping.

11. The programmable switch of claim 10, wherein the circuitry is further configured to determine that a different NVMe node has become inactive based on at least one of detecting inactivity of a port of the plurality of ports that is connected to the different NVMe node and reaching a predetermined number of successive unacknowledged messages sent to the different NVMe node.

12. The programmable switch of claim 10, wherein the circuitry is further configured to:
determine that a new NVMe node has been connected to a port of the plurality of ports; and
add one or more new NVMe namespaces to the mapping that are associated with one or more new physical storage locations in the new NVMe node.

13. The programmable switch of claim 10, wherein the circuitry is further configured to temporarily retain data sent to a target NVMe node after sending the data in a message to the target NVMe node.

14. The programmable switch of claim 10, wherein the circuitry is further configured to:
send a message to a target NVMe node of the plurality of NVMe nodes;
determine whether a timeout value has been reached for receiving an acknowledgment of the sent message from the target NVMe node; and
in response to the timeout value being reached without receiving the acknowledgment from the target NVMe node, resend the message to a different NVMe node.

15. The programmable switch of claim 10, wherein the circuitry is further configured to send a notification to a network controller of the removed one or more NVMe namespaces to update a global mapping of active NVMe namespaces to NVMe nodes in the network.

16. The programmable switch of claim 10, wherein the mapping further indicates other NVMe nodes that have accessed data in a particular NVMe namespace.

17. The programmable switch of claim 10, wherein the programmable switch is a Top of Rack (ToR) switch for the plurality of NVMe nodes.

18. The programmable switch of claim 10, wherein the circuitry is further configured to:
detect activation of a port of the plurality of ports; and
in response to detecting the activation of the port, perform an NVMe discovery service to determine whether one or more new NVMe namespaces are available via the activated port.

19. A network controller for a network including a plurality of Non-Volatile Memory express (NVMe) nodes, the network controller comprising:
at least one memory storing a global mapping of active NVMe namespaces to physical blocks located in the plurality of NVMe nodes, wherein each NVMe node of the plurality of NVMe nodes is a separate physical device configured to communicate on the network;
an interface configured to communicate with a plurality of programmable switches; and
means for:
receiving a notification from a programmable switch of the plurality of programmable switches that an NVMe node has become inactive;
updating the global mapping based on the received notification to remove one or more NVMe namespaces corresponding to the inactive NVMe node; and
sending, via the network, at least one notification to at least one NVMe node of the plurality of NVMe nodes indicating that the one or more NVMe namespaces have been removed from the global mapping.

20. The network controller of claim 19, further comprising means for identifying the at least one NVMe node using the global mapping, wherein the global mapping indicates which NVMe nodes have accessed the one or more NVMe namespaces.

* * * * *